United States Patent
Watford et al.

(10) Patent No.: US 9,604,334 B2
(45) Date of Patent: Mar. 28, 2017

(54) POSITIVE FEED TOOL WITH A SLIP CLUTCH AND A METHOD, TO PREVENT JAMMING

(71) Applicant: Apex Brands, Inc., Apex, NC (US)

(72) Inventors: Jeremy Watford, Irmo, SC (US); Kevin Myhill, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 14/770,029

(22) PCT Filed: Feb. 24, 2014

(86) PCT No.: PCT/US2014/018055
§ 371 (c)(1),
(2) Date: Aug. 24, 2015

(87) PCT Pub. No.: WO2014/133971
PCT Pub. Date: Sep. 4, 2014

(65) Prior Publication Data
US 2016/0001435 A1 Jan. 7, 2016

Related U.S. Application Data

(60) Provisional application No. 61/822,959, filed on May 14, 2013, provisional application No. 61/769,736, filed on Feb. 26, 2013.

(51) Int. Cl.
| | |
|---|---|
| *B23Q 11/04* | (2006.01) |
| *B23Q 5/52* | (2006.01) |
| *B23Q 5/32* | (2006.01) |
| *B25F 5/00* | (2006.01) |
| *B25F 5/02* | (2006.01) |

(Continued)

(52) U.S. Cl.
CPC ............. *B23Q 5/326* (2013.01); *B23Q 5/261* (2013.01); *B23Q 5/263* (2013.01); *B23Q 5/265* (2013.01); *B23Q 11/04* (2013.01); *B25B 21/00* (2013.01); *B25F 3/00* (2013.01); *B25F 5/00* (2013.01); *B25F 5/001* (2013.01); *B25F 5/02* (2013.01);

(Continued)

(58) Field of Classification Search
USPC .......................................... 173/216; 408/139
See application file for complete search history.

(56) References Cited

U.S. PATENT DOCUMENTS

| | | |
|---|---|---|
| 1,312,644 A | 8/1919 | Raab et al. |
| 2,893,272 A | 7/1959 | Linsker |

(Continued)

FOREIGN PATENT DOCUMENTS

| | | |
|---|---|---|
| CN | 201093036 Y | 7/2008 |
| CN | 101377229 A | 3/2009 |

(Continued)

*Primary Examiner* — Michelle Lopez
(74) *Attorney, Agent, or Firm* — Coats & Bennett, P.L.L.C.

(57) ABSTRACT

Positive feed tools and methods of use that include a spindle with a distal end configured to receive a tool bit. The spindle is movable in a forward direction for the tool bit to act on a workpiece, and a retract direction to move the tool bit away from the workpiece. The spindle is configured to retract to a home position at which an air motor that drives the spindle is shut off. The feed tool includes a clutch to prevent jamming of the spindle at the home position in the event the air motor is not shut off at the proper time.

15 Claims, 13 Drawing Sheets

(51) Int. Cl.
  *B23Q 5/26* (2006.01)
  *B25B 21/00* (2006.01)
  *B25F 3/00* (2006.01)
  *F16K 1/34* (2006.01)
  *F16K 27/02* (2006.01)
  *F16K 31/122* (2006.01)

(52) U.S. Cl.
  CPC ............... *F16K 1/34* (2013.01); *F16K 27/02* (2013.01); *F16K 31/1225* (2013.01)

(56) References Cited

U.S. PATENT DOCUMENTS

| | | |
|---|---|---|
| 3,411,385 A | 11/1968 | Quackenbush |
| 3,577,807 A | 5/1971 | Alexander et al. |
| 4,538,942 A * | 9/1985 | Vindez .................. B23Q 5/326 173/146 |
| 4,850,753 A | 7/1989 | Dudden |
| 5,860,446 A | 1/1999 | Hunt |
| 7,806,637 B2 | 10/2010 | Oehninger et al. |
| 8,469,641 B2 | 6/2013 | Jaillon |
| 2008/0260485 A1 | 10/2008 | Jaillon et al. |

FOREIGN PATENT DOCUMENTS

| | | |
|---|---|---|
| EP | 0060186 A2 | 9/1982 |
| EP | 1618978 A1 | 1/2006 |
| EP | 1916045 A1 | 4/2008 |
| FR | 2881366 A1 | 8/2006 |
| GB | 2195164 A | 3/1988 |
| WO | 0078502 A2 | 12/2000 |
| WO | 0105559 A2 | 1/2001 |

\* cited by examiner

POSITIVE FEED TOOL WITH A SLIP CLUTCH AND A METHOD, TO PREVENT JAMMING

RELATED APPLICATIONS

The present application claims priority to U.S. Application No. 61/769,736 filed on Feb. 26, 2013 entitled Feed Drill and U.S. Application No. 61/822,959 filed on May 14, 2013 entitled Feed Drill.

BACKGROUND

The present application is directed to tools that provide for moving a spindle in both advance and retract feed directions and specifically to devices and methods to prevent the spindle from becoming jammed at a home position.

Positive feed tools, such as but not limited to feed drills, are conventionally known for performing operations on workpieces formed of substances such as steel, aluminum, titanium, and composites. Positive feed tools include a tool feed mechanism that feeds a bit into a work piece. Conventional applications for positive feed tools include, among other applications, drilling holes in various parts of aircraft.

A positive feed tool generally includes a motor that is attached to a gear head. The gear head includes a spindle that is rotated and moved in forward and retract directions. In use, the motor drives gears in the gear head that advance the spindle in the forward direction to a desired depth to act on the workpiece. The spindle is then moved in the reverse direction away from the workpiece to a home position. When the spindle reaches the home position, it is desirable that the motor is shut off to minimize air usage and to indicate to the operator that the tool function has been completed.

Previous tools have potential reliability problems which can lead to jamming of the spindle in the home position due to a delay or failure in shutting off the motor. These may cause the spindle to go in to a mechanical lock.

Previous tools have employed various aspects to prevent jamming of the spindle. These aspects have included increasing an over-travel distance of the spindle, and slowing the retract speed of the spindle. However, each of these aspects has their own disadvantages in terms of increasing cycle time, adding more complexity to the drive train design and increasing overall size of the gear head. Further, these aspects still have the potential for the spindle to jam in the home position, especially if the signal to stop the motor fails.

SUMMARY

The present application is directed to devices and methods of preventing jamming of the spindle in the home position. The designs and methods mount a mechanism that stops a differential feed gear on a secondary slip clutch. In the event that the limit of the spindle travel is reached when the spindle has retracted and the air motor has not yet shut off, this will allow the differential feed gear and spindle feed gear to rotate again thereby eliminating the tool going into mechanical jam.

One embodiment is directed to a positive feed tool configured to operate in a forward direction and a reverse direction. The feed tool includes an elongated spindle aligned with and configured to axially move along a feed path with the spindle including a retract stop to control an extent of axial movement of the spindle in the reverse direction. The tool also includes a spindle rotation mechanism couple to the spindle to rotate the spindle, a spindle feed gear and a differential feed gear configured to drive the spindle feed gear axially along the feed path with the spindle feed gear and the differential feed gear each including gear teeth that are engaged together, and a clutch mechanism positioned at the differential feed gear to selectively control rotation of the differential feed gear with the clutch mechanism including a contact member and a biasing member. The clutch mechanism is configured to prevent the differential feed gear and the spindle feed gear from rotating during movement of the spindle in the reverse direction prior to engagement of the retract stop and a stop member, and respond to attempted further movement of the spindle in the reverse direction after engagement of the retract stop and the stop member by allowing movement between the contact member of the clutch mechanism and the differential feed gear thereby providing for rotation of the differential feed gear and the spindle feed gear.

The differential feed gear may directly contact against the clutch mechanism during movement of the spindle in the reverse direction prior to engagement of the retract stop and the stop member.

The spindle feed gear may be spaced away from the clutch mechanism and may be connected to the clutch mechanism through the differential feed gear.

The clutch mechanism may include a cone member that includes a first angled cam face and the differential feed gear may include a second angled cam face, with the first and second angled cam faces contacting together during movement of the spindle in the reverse direction.

The clutch mechanism may also include a cone member and a plurality of ball members that extend through the contact member and are biased against the cone member by the biasing member.

The cone member may include pockets along a radial face with each of the pockets sized to receive one of the ball members with the ball members being larger than the pockets such that the ball members extend outward beyond the pockets.

The positive feed tool may also include an adjustment member operatively connected to the biasing member to adjust an amount of force applied by the biasing member with the adjustment member being movably connected to the contact member and being positioned on an opposing side of the contact member from the cone member.

The differential feed gear may be axially aligned along a feed shaft with the contact member with the differential feed gear being axially movable relative to the contact member.

Another embodiment is directed to a method of preventing jamming of a spindle in a positive feed tool. The method includes rotating a spindle and rotating a spindle feed gear that is positioned around the spindle and moving the spindle in a first direction along a feed path with the spindle feed gear being rotated through engagement with a differential feed gear. The method includes preventing the rotating spindle from moving in the first direction and begin moving the rotating spindle feed gear axially along the spindle in an opposing second direction. The method includes applying a clutch force to the differential feed gear to prevent the differential feed gear and the spindle feed gear from rotating while the spindle continues to rotate and begin moving the rotating spindle in the second direction. The method includes increasing a force applied to the spindle feed gear as the spindle feed gear moves in the second direction and is prevented from rotating. When the force on the spindle feed gear increases to an extent in which a first torque for the differential feed gear to rotate the spindle feed gear becomes greater than a second torque for the differential feed gear to rotate against the clutch force, the method includes rotating the differential feed gear and the engaged spindle feed gear. The method also includes rotating the spindle feed gear about the spindle and preventing further movement of the spindle in the second direction.

The method may also include moving the spindle in the second direction and contacting a retract stop member on the spindle against a contact member while the spindle feed gear is prevented from rotating.

The method may also include biasing a plurality of ball members against an intermediate member that is engaged with the differential feed gear and applying the clutch force to the differential feed gear.

The method may include moving a plurality of ball members out of corresponding pockets and rotating the differential feed gear and the engaged spindle feed gear.

The method may include moving the differential feed gear axially relative to the spindle feed gear and into engagement with a clutch member and preventing rotation of the differential feed gear.

The method may include that preventing the rotating spindle from moving in the first direction includes contacting a depth stop member connected to the spindle against a contact member.

The method may also include moving the spindle feed gear axially along the spindle and against a spindle drive gear after contacting the retract stop member on the spindle against the contact member.

The various aspects of the various embodiments may be used alone or in any combination, as is desired.

DETAILED DESCRIPTION

Figure 1:
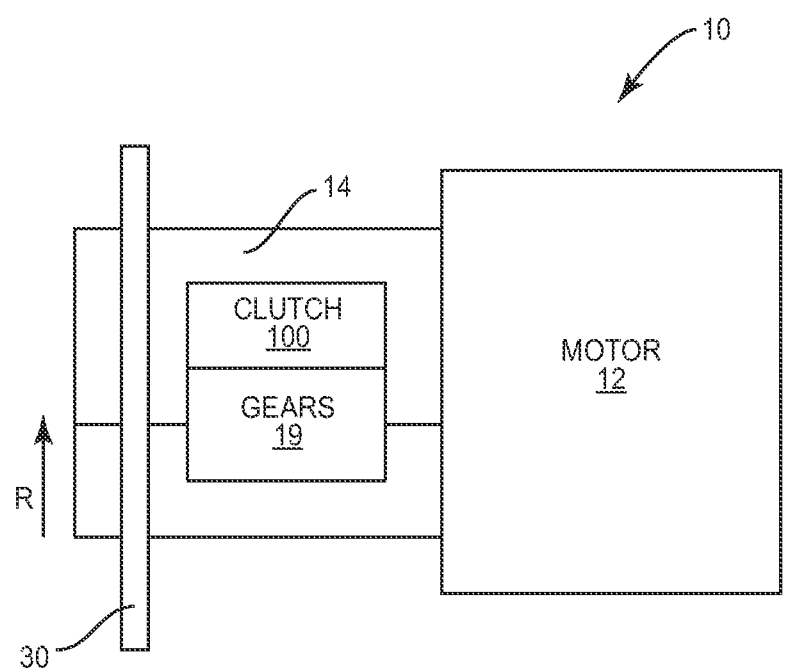
FIG. 1 is a schematic view of a positive feed tool with a slip clutch.

The present application improves the operation of a positive feed tool by preventing a spindle from becoming jammed in a home position in the event a motor that drives the spindle does not shut off. As schematically illustrated in FIG. 1, the tool 10 includes a motor 12 that drives gears 19 in a gear head 14 to rotate a spindle 30. When the spindle 30 reaches a home position, a signal is generated to stop the motor 12 to prevent further movement of the spindle 30 in the retract direction R. The clutch 100 is configured to slip in the event of delay or failure in the stop signal thus preventing mechanical locking of the spindle 30. This design allows for minimum over-travel and more accurate stop position for the spindle 30.

Figure 2:
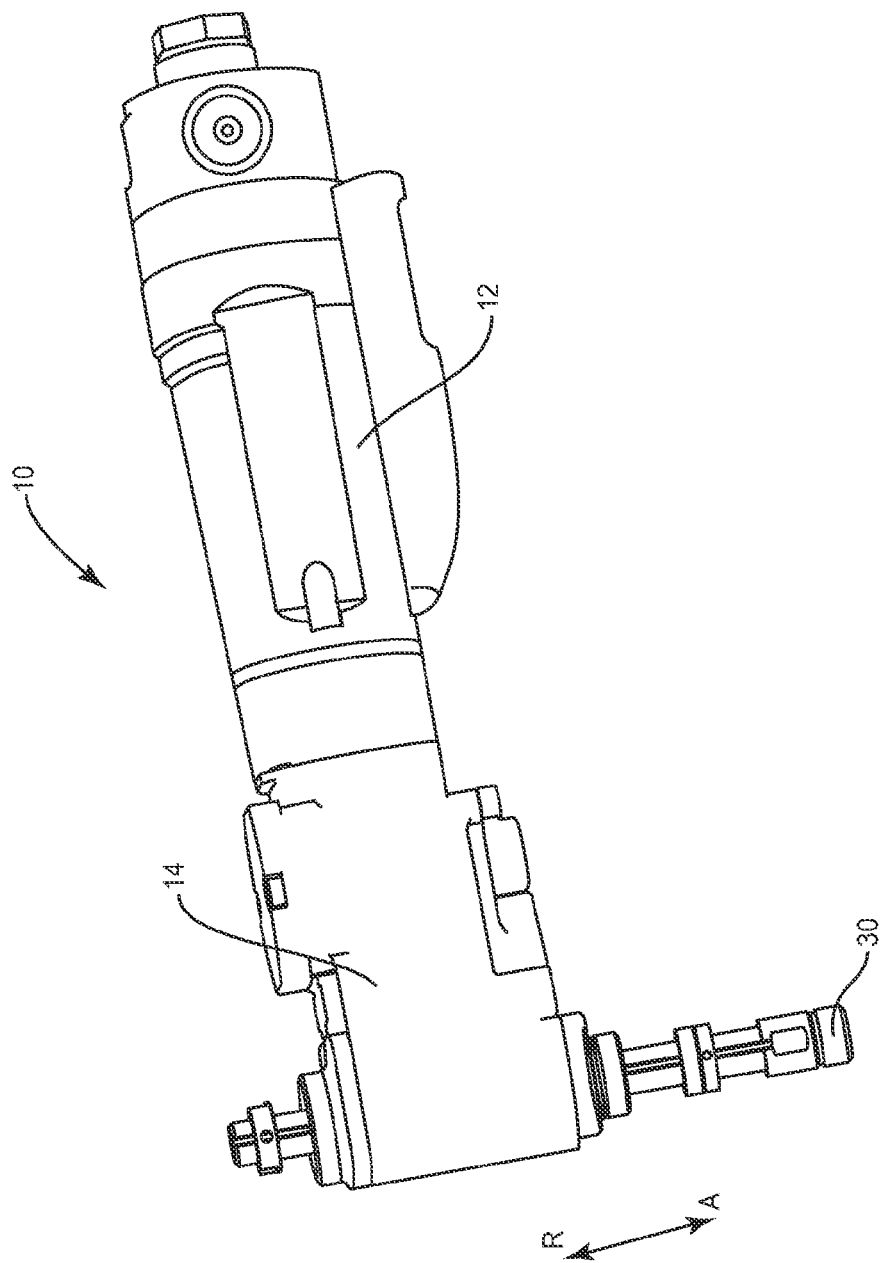
FIG. 2 is a perspective view of a right-angle tool.
Figure 3:
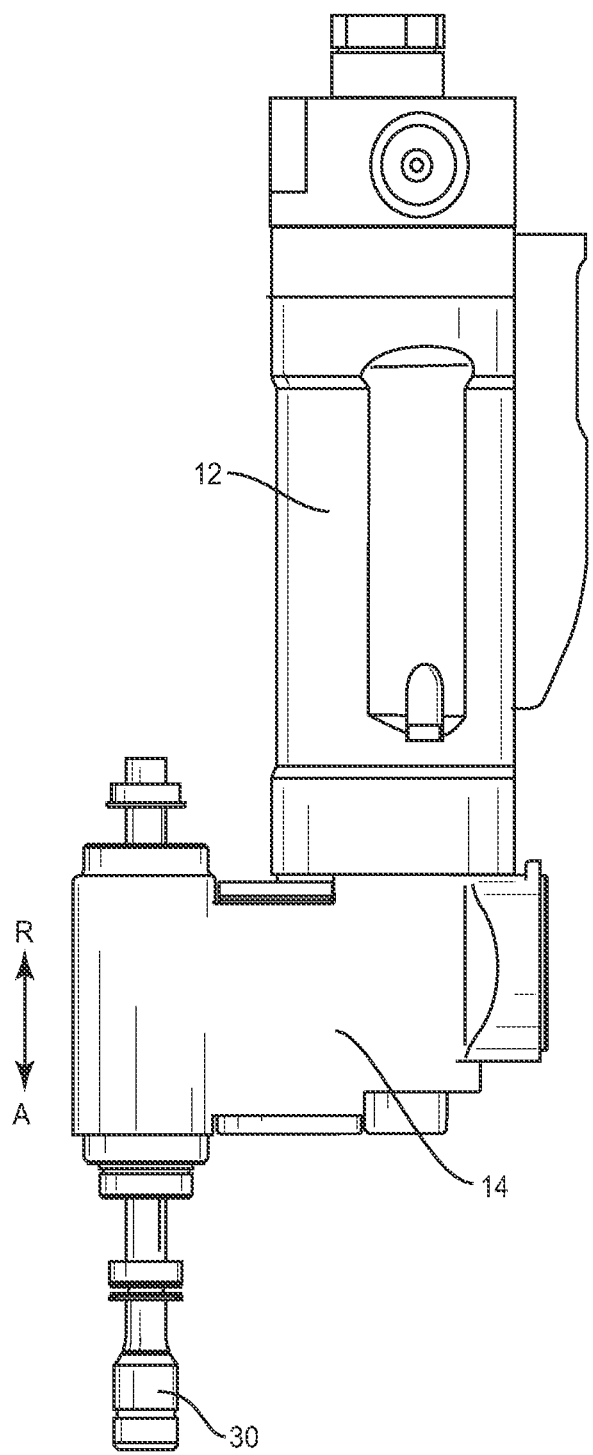
FIG. 3 is a perspective view of an in-line tool.

FIG. 2 illustrates an example of a conventional positive feed tool, specifically a right-angle positive feed tool 10. FIG. 3 illustrates an inline configuration of a positive feed tool 10. Right angle and inline refer to the position of the motor 12 relative to an axis of the spindle 30. The positive feed tool 10 generally includes a gear head 14 with a spindle 30 that, in addition to rotating, advances a predetermined amount per revolution toward the workpiece to be drilled. The spindle 30 is designed to move in the advance or forward direction A towards a workpiece and in a retract (i.e., reverse) direction R away from the workpiece. The motor 12 may be powered by a pressurized air source (not illustrated) or may be electric to power the gear head 14 and thus rotate the spindle 30. The motor 12 may also be driven by a hydraulic fluid.

Figure 4:
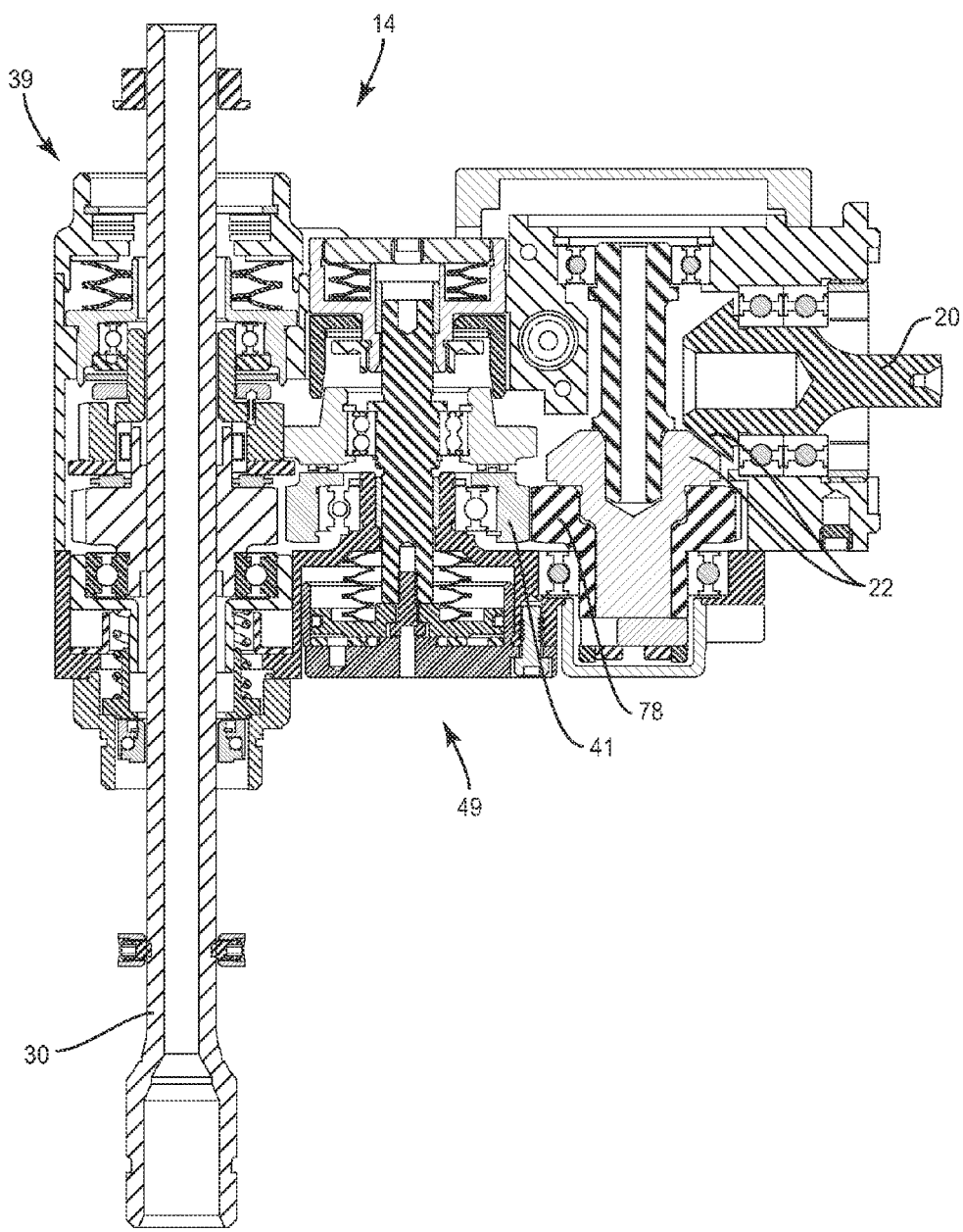
FIG. 4 is a side sectional view of a gear head.

FIG. 4 illustrates a side schematic view of a right angle feed gear head 14 separated from the motor 12 (not illustrated in FIG. 4). The gear head 14 includes an input shaft 20 that is driven by the motor 12. A set of bevel gears 22 is employed to provide rotation to an input gear 78. The input gear 78 is connected to a differential unit 49 which in turn drives a spindle unit 39 that includes the spindle 30. A similar configuration is used for an inline tool with the input gear 78 being driven directly by the motor 12. For both a right angle gear head 14 and inline gear head 14, the spindle unit 39 and differential unit 49 are substantially the same.

Figure 5:
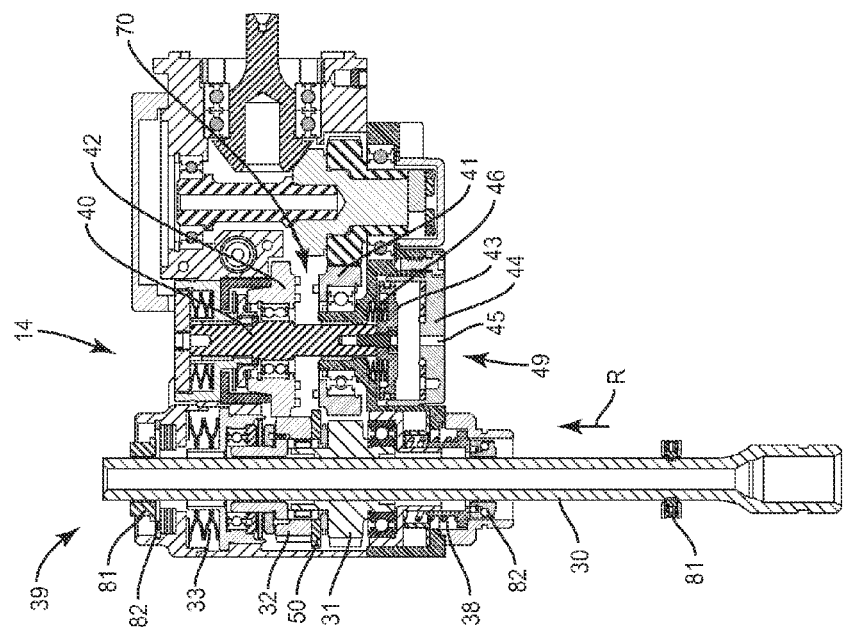
FIG. 5 is a side sectional view of a gear head in a forward feed operation.
Figure 6:
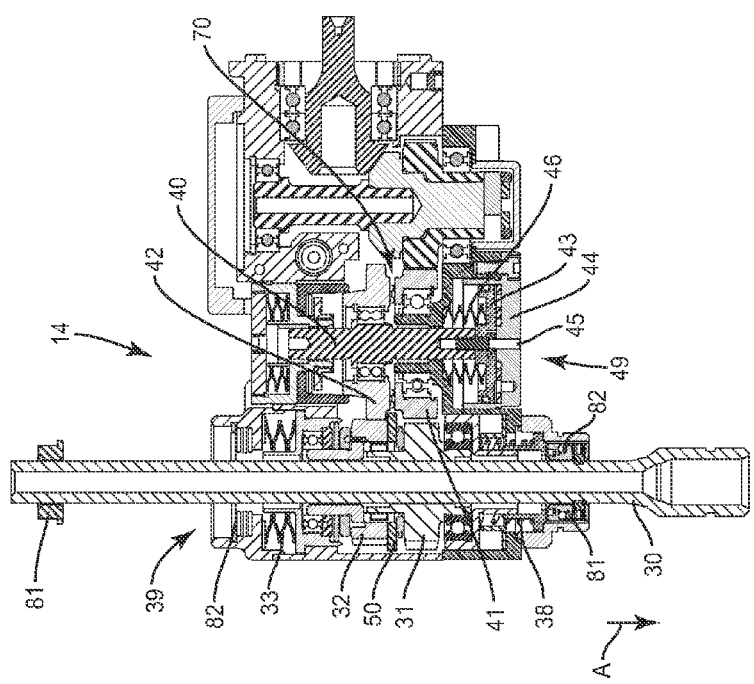
FIG. 6 is a side sectional view of a gear head in a retract feed operation.

As illustrated in FIGS. 5 and 6, the differential unit 49 is powered through the motor 12 and engages with and drives the spindle unit 39. The spindle unit 39 includes one or more of the spindle 30, spindle drive gear 31, and a spindle feed gear 32. The differential unit 49 includes one or more of the differential drive gear 41, differential feed gear 42, and a feed shaft 40. The units 39, 49 are generally aligned with the spindle 30 being parallel to the feed shaft 40.

The spindle 30 is an elongated member that includes one or more slots for engagement with the drive gear 31 and threads for engagement with the feed gear 32. A distal end of the spindle 30 is configured to receive a tool bit for performing operations on the workpiece. One or more stop members 81 may be attached to the spindle 30 to control an extent of axial movement of the spindle 30 in the advance and retract directions. The stops 81 are attached to the spindle 30 and move axially with the spindle 30. In one or more embodiments, the stops 81 are collars that are threaded onto the spindle 30. The stops 81 extend radially outward from the spindle 30 and are sized to contact against a respective contact member 82 to prevent additional axial movement of the spindle 30. To prevent damage, one or both of the contact members 82 may include a bearing at the point at which the spindle 30 can no longer be driven forward.

In one embodiment as illustrated in FIGS. 5 and 6, the spindle 30 includes two stops 81. A first depth stop 81 is positioned along a proximal section of the spindle 30 to control an extent of movement in the forward direction. The depth stop 81 contacts against a contact member 82 at a top of the gear head 14 to prevent additional axial movement in the forward direction. A second retract/home stop 81 is positioned along a distal section of the spindle 30 to control an extent of reverse movement. This retract/home stop 81 contacts against a contact member 82 at a lower portion of the gear head 14.

The retract/home depth stop 81 establishes the home position of the spindle 30. The home position may be the farthest extent of axial movement of the spindle 30 in the reverse direction. In one or more embodiments, the home position is the axial position of the spindle 30 at which the retract/home depth stop 81 contacts against the contact member 82.

In one or more embodiments, the gear head 14 is configured to accommodate over-travel of the spindle 30 in the reverse direction. The contact member 82 may be movably attached to a housing of the gear head 14. A biasing member 38 biases the contact member 82 outward away from the housing. In the event the retract/home stop member 81 contacts against the contact member 82 while the spindle 30 is still moving in the reverse direction, the contact member 82 is able to move axially inward towards the housing against the force of the biasing member 38. This additional over-travel distance provides for additional axial movement of the spindle 30 after the home/retract stop 81 has contacted against the contact member 82.

The drive gear 31 and feed gear 32 each include an annular shape with a central opening to receive the spindle 30. The spindle feed gear 32 includes internal threads that are threaded onto external threads that extend along the length of the spindle 30. Hence, when the spindle feed gear 32 is rotated in relation to the spindle 30, the spindle 30 will feed in the advance direction through the spindle feed gear 32. In one or more embodiments, external threads of the spindle 30 are left-handed threads. The spindle 30 also includes slots that extend along its length. The spindle drive gear 31 includes internal male splines that engage with the drive grooves on the spindle 30. Thus, when the spindle drive gear 31 is rotated, the spindle 30 also rotates. Teeth extend around the outer periphery of each gear 31, 32 to engage with corresponding teeth in the gears of the differential unit 49. A biasing member 33 is positioned to force the spindle feed gear 32 towards the spindle drive gear 31.

In the differential unit 49, each of the drive gear 41 and feed gear 42 extend around the feed shaft 40 and include teeth around their periphery to respectively engage with the corresponding gears 31, 32 of the spindle unit 39. The differential feed gear 42 is attached to the feed shaft 40 and axially moves with the feed shaft 40. The differential drive gear 41 extends around the feed shaft 40 but does not axially move with the feed shaft 40 (i.e., the feed shaft 40 slides through a central opening in the differential drive gear 41).

A piston 43 is attached to the feed shaft 40 and axially moves with the feed shaft 40. The piston 43 is positioned within the interior of a cylinder 44 and is sized to extend across the cylinder 44. An inlet 45 is positioned at a bottom of the cylinder 44. The inlet 45 is sized to include a smaller area than the cross-sectional size of the cylinder 44. A biasing member 46 extends along the feed shaft 40 between the piston 43 and the differential drive gear 41. The biasing member 46 biases the piston 43 towards the inlet 45.

The differential drive gear 41 is driven through the motor 12. Differential drive gear 41 engages with drive gear 31 which is operatively connected to the spindle 30 to thereby provide rotation to the spindle 30. The differential drive gear 41 is also operatively connected to and rotates the differential feed gear 42. The differential feed gear 42 engages with the spindle feed gear 32 which is threaded onto the spindle 30. The feed gears 32, 42 provide for the spindle 30 to move in the advance and retract directions with the rate and direction of feed based on ratios between the drive gear 41/drive gear 31 and the feed gear 42/feed gear 32. In one or more embodiments, the thread on the spindle 30 is made left hand such that feed in the advance direction is achieved by rotating the spindle feed gear 32 faster than the spindle drive gear 31.

To move the spindle 30 in the retract direction the differential feed gear 42 is disengaged from the differential drive gear 41. As the differential feed gear 42 is not otherwise driven, the differential feed gear 42 becomes stationary. Because the feed gear 32 is driven through the feed gear 42, the spindle feed gear 32 also becomes stationary. With the spindle 30 still being driven by the spindle drive gear 31 (through the differential drive gear 41), the spindle 30 is caused to retract due to the threads along the length of the spindle 30 that are engaged in the now stationary spindle feed gear 32.

The tool 10 may include various manners of disengaging the differential feed gear 42 from the differential drive gear 41. The disengagement includes that the differential feed gear 42 and differential drive gear 41 move axially apart. This may include one or more of a torque overload clutch 70 between the differential feed gear 42 and the differential drive gear 41, a mechanical lift ring 50 that moves the differential feed gear 42, and a two-stage piston 43. In one or more embodiments, the tool 10 includes each of these aspects. Other embodiments include the feed tool 10 having just a single one of these aspects. Still other embodiments may include the feed tool 10 having two or more of these aspects. In one specific embodiment, the tool 10 includes a lift ring 50 and a two-stage piston 60. In another specific embodiment, the tool 10 includes a torque overload clutch 70 and a two-stage piston 60.

The torque overload clutch 70 is one manner to shift the tool 10 between forward and retract operations. The clutch 70 includes matching ramps 85 on the contact faces of the differential drive gear 41 and differential feed gear 42. The ramps 85 mate together for the drive gear 41 to rotate the feed gear 42. The force of the biasing member 46 maintains engagement between the ramps 85 on the opposing gears 41, 42.

Figure 7:
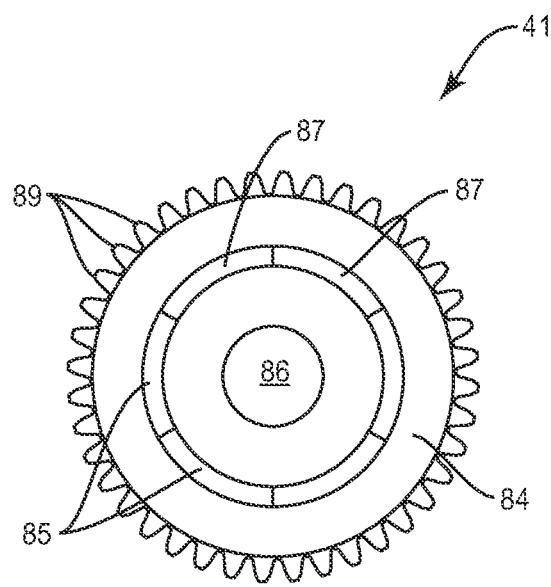
FIG. 7 is a top view of a differential drive gear with ramps that form a portion of a threshold clutch.
Figure 7A:
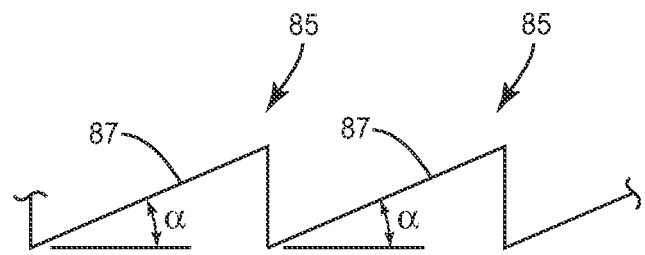
FIG. 7A is a side view of two of the ramps of FIG. 7.

FIG. 7 illustrates a top view of the differential drive gear 41 that includes a circular cross sectional shape. A central opening 86 is sized to receive the feed shaft 40. The axial face 84 that faces towards the differential feed gear 42 includes ramps 85 that each includes a sloped cam face 87 as best illustrated in FIG. 7A. The cam faces 87 are aligned at an angle $\alpha$ with the axial face 84. The angle $\alpha$ may vary depending upon the extent of necessary engagement. In one or more embodiments, the ramps 85 extend completely around the central opening 86. Other embodiments may include different numbers and configurations of ramps 85. The differential feed gear 42 includes a similar configuration with corresponding ramps 85 that mate together. The ramps 85 on the opposing gears 42, 41 may include the same or different angles $\alpha$.

Figure 8:
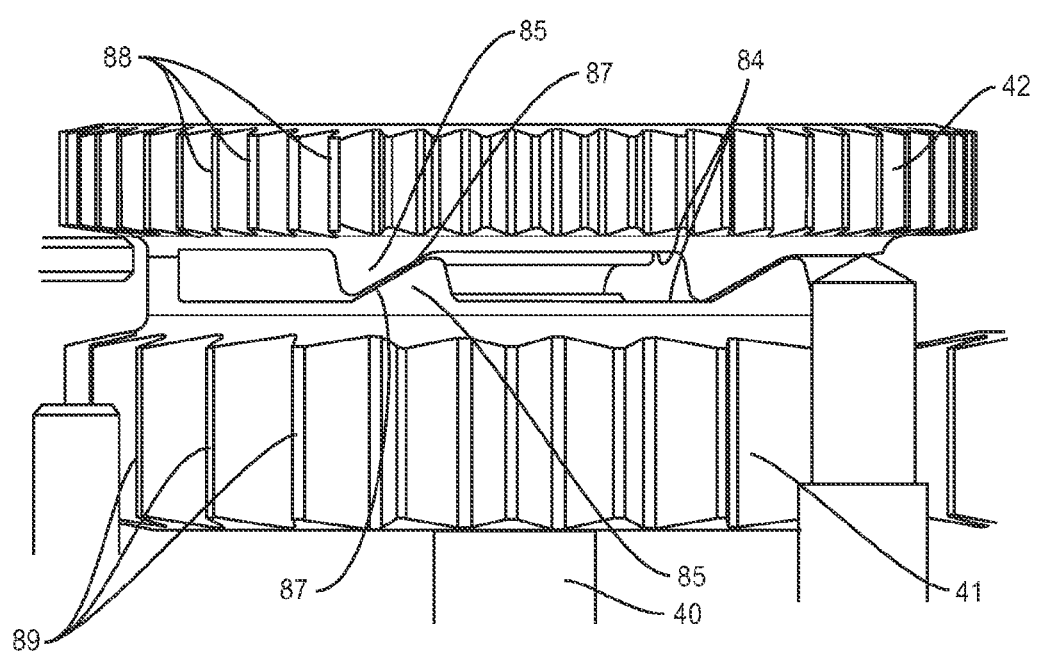
FIG. 8 is a side perspective view of a threshold clutch formed between a differential drive gear and a differential feed gear.

FIG. 8 illustrates the differential drive gear 41 and feed gear 42 mated together, such as when the tool 10 is operating in the advance direction. The cam faces 87 of the opposing ramps 85 contact together for the drive gear 41 to rotate the feed gear 42. The drive gear 41 also includes the gear teeth 89 along the periphery that engage with corresponding teeth on the spindle drive gear 31. Likewise, the feed gear 42 includes peripheral teeth 88 that engage with teeth on the spindle feed gear 32. The ramps 85 are held in contact at least by the biasing force applied to the gears 41, 42 by the biasing member 46. In the event that the differential feed gear 42 cannot be driven, then the two gears 41, 42 will separate along the axis of the differential feed shaft 40. The amount of torque for overload to cause the separation is a function of the force applied by the biasing member 46 and the angle a of the cam faces 87.

When the tool 10 is operating in the forward direction as illustrated in FIG. 5, the differential feed gear 42 is coupled to the differential drive gear 41 through the clutch 70 that includes the matching ramps 85 that are held in contact by the bias force of the biasing member 46. The spindle feed gear 32 rotates at a differential speed relative to the spindle drive gear 31 hence causing the spindle 30 to advance. At the extent of movement of the spindle 30 in the advance direction, additional movement of the spindle 30 is stopped through the upper depth stop member 81 contacting against the contact member 82. At the contact between the depth stop 81 and the contact member 82, the drive to the spindle feed gear 32 is still occurring from the differential feed gear 42 (through the differential drive gear 41). As the spindle 30 is prevented from moving axially forward but is still being rotated through the spindle drive gear 31, the spindle feed gear 32 that is threaded onto the spindle 30 moves axially backwards along the spindle 30. This movement causes the spindle feed gear 32 to move against the biasing member 33. This structure is developed for "thrust overload" and is of particular advantage for tools that are used for countersinking where a small dwell period at the end of the spindle stroke is greatly advantageous for accurate countersink depth and maintaining a clean finish on the countersink form.

In one or more embodiments, the biasing member 33 includes one or more Belleville washers, wave springs, magnets, and compression springs. The member 33 has a preload approximately equal to the thrust rating of the gear head 14. The backward movement of the spindle feed gear 32 along the spindle 30 causes the gear 32 to move against the biasing member 33. This results in additional torque being needed through the differential feed gear 42 to rotate the spindle feed gear 32. This additional torque in return requires additional torque to be supplied by the differential drive gear 41. The additional torque required between the differential drive and feed gears 41, 42 causes the cam faces 87 to slide against each other and for the gears 41, 42 to axially separate and to disengage. The disengagement causes the differential feed gear 42 and thus the spindle feed gear 32 to each become stationary. The rotation of the spindle 30 through the stationary feed gear 32 results in the spindle 30 to begin to move in the retract direction.

In another embodiment, or in combination with the clutch 70, the spindle feed gear 32 includes a lift ring 50. As illustrated in FIGS. 5 and 6, the ring 50 extends radially outwardly beyond the teeth of the spindle feed gear 32 and under the differential feed gear 42. When the spindle 30 is moving in the forward direction, the lift ring 50 extends below the bottom axial face of the differential feed gear 42. At the end of stroke or thrust overload condition the spindle feed gear 32 moves backward as described above. As the spindle feed gear 32 moves axially along the spindle 30, the lift ring 50 acts on the differential feed gear 42 and moves the lift ring 50 away from the differential drive gear 31.

In one or more embodiments, the lift ring 50 may be attached to the spindle feed gear 32. The lift ring 50 and feed gear 32 may be formed as an integral part, such as being molded together as a single, unitary construction. The lift ring 50 may also be attached to the underside of the feed gear 32 through one or more mechanical fasteners and/or adhesives. The lift ring 50 may also be a separate element that is held in contact against the underside of the feed gear 32 by a biasing member 38.

Figure 9A:
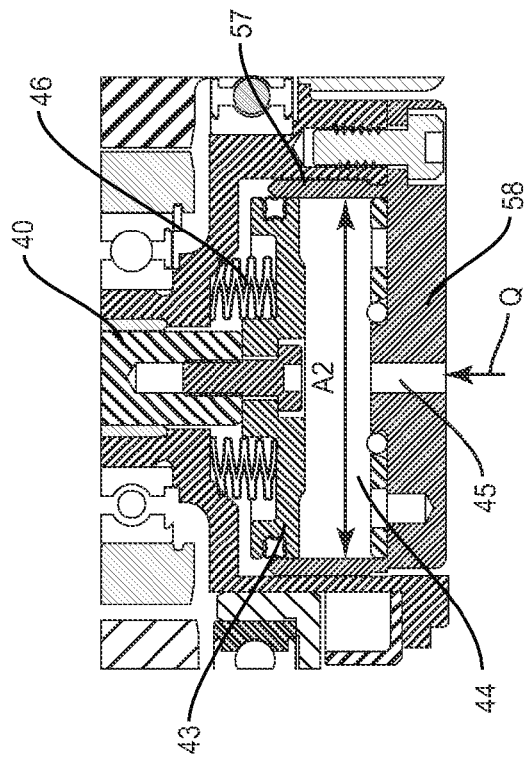
FIG. 9A is a side sectional view of a piston in a first position across an inlet with the tool in a forward feed operation.
Figure 9B:
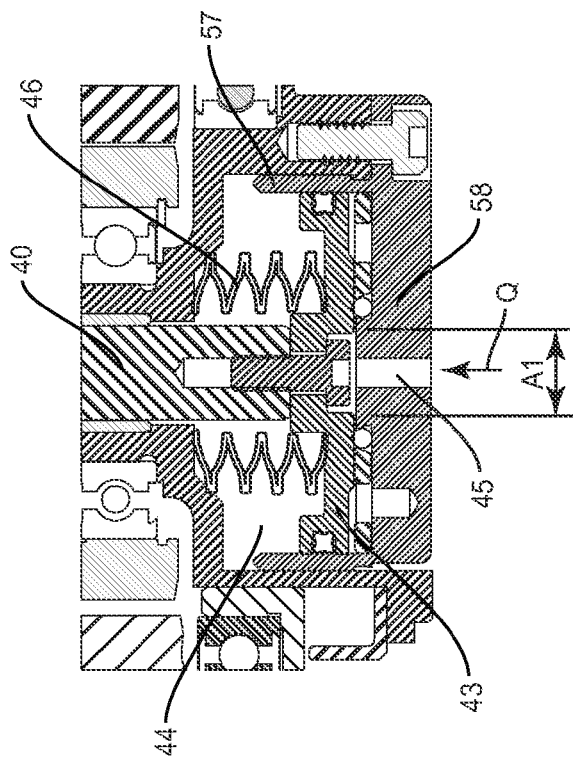
FIG. 9B is a side sectional view of a piston in a second position spaced away from the inlet with the tool in a retract operation.

In one or more embodiments, the torque clutch 70 and/or lift ring 50 axially move the differential feed gear 42 a limited amount to disengage from the differential drive gear 41. The piston 43 may be further configured to provide additional axial movement of the differential feed gear 42. The piston 43, feed shaft 40, and differential feed gear 42 are connected together to axially move as a unit. As illustrated in FIGS. 9A and 9B, the piston 43 is positioned in the cylinder 44 that includes the outer walls 57 and a bottom wall 58. The cross-sectional shape of the cylinder 44 matches the piston 43 such that the piston 43 extends across the cylinder 44 and the piston 43 is able to move axially within the cylinder 44. The bottom wall 58 includes the inlet 45 that provides for introduced air to act on an area A1 of the piston 43 that is less than the area of the cylinder 44. Air from an air logic system is moved in the direction of arrow Q into the inlet 45.

When the tool 10 is operating in the forward direction as illustrated in FIG. 9A, the piston 43 is positioned at the bottom wall 58 and extends over the inlet 45. Thus, the air acts on just the portion of the piston 43 equal to area A1 that is exposed through the inlet 45. The force of the biasing member 46 pressing downward on the piston 43 is greater than the force exerted by the air on the reduced area A1 of the piston 43. Thus, the piston 43 (and the attached feed shaft 40 and differential feed gear 42) remain in the same axial position.

Once the movement of the differential feed gear 42 is initiated through the lift ring 50 and/or threshold clutch 70, the piston 43 also moves axially in the cylinder 44 away from the bottom wall 58 as it is coupled to the differential feed gear 42 through the differential feed shaft 40. The bottom of the piston 43 moves away from the inlet 45 thus allowing air to act on a larger area A2 of the piston 43. This results in a larger force being supplied through the air. The larger force overcomes the biasing member 46 and axially moves the piston 43 and thus also moves the differential feed gear 42 into contact with a holding mechanism. The use of air to move the piston 43 greatly reduces the time to shift the differential feed gear 42 from the forward position to the retract position. This also greatly reduces the possibility of jamming.

The clutch 100 is positioned along the differential unit 49 to control movement of the differential feed gear 42 and the spindle feed gear 32. In one or more embodiments, the clutch 100 provides for rotation of the differential feed gear 42 in the event of excessive torque to prevent jamming when the spindle 30 is moving in the retract direction. The clutch 100 may also prevent rotation of the differential feed gear 42 when the tool 10 is operating in the retract direction. In one or more other embodiments, the clutch 100 just provides for rotation of the differential feed gear 42 to prevent jamming.

Figure 10:
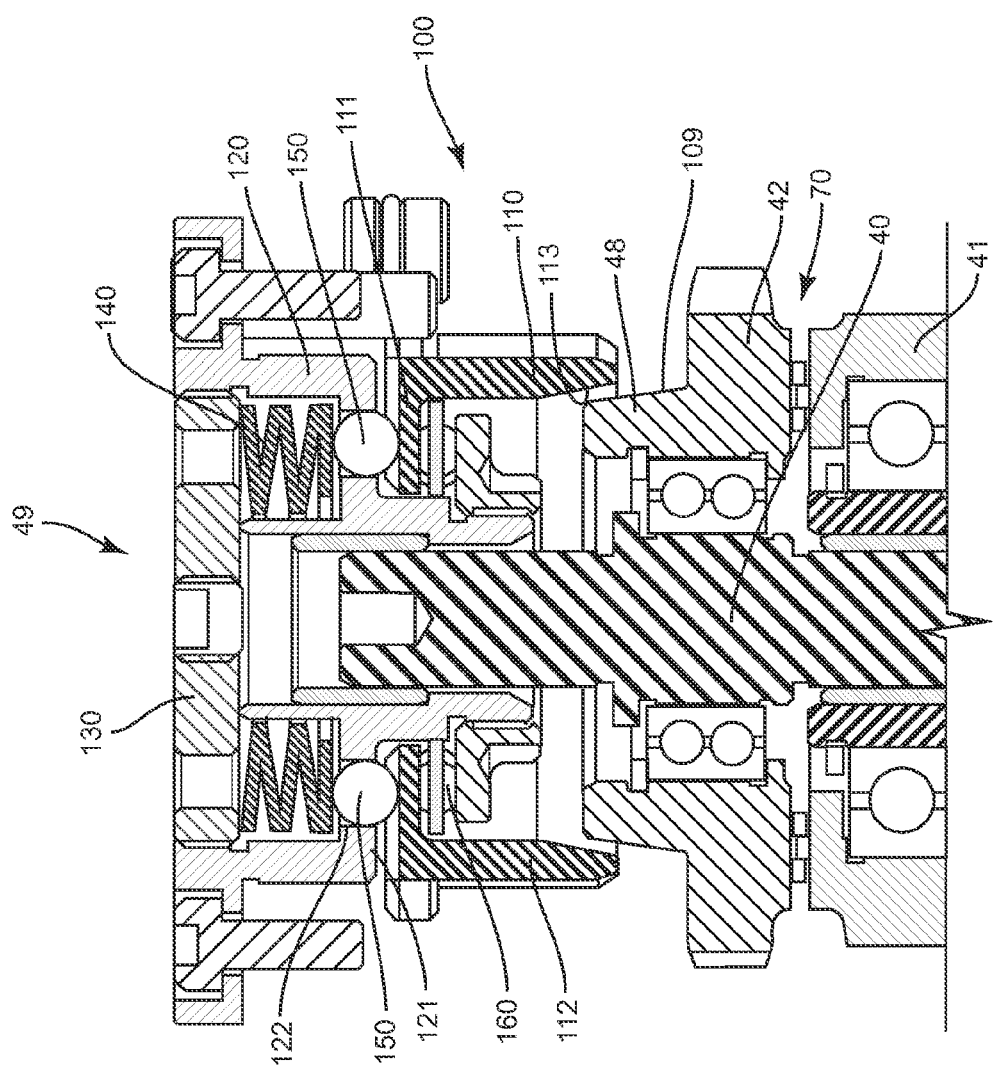
FIG. 10 is a schematic side sectional view of a slip clutch cut through a plane that extends through the feed shaft according to one embodiment.

FIG. 10 illustrates one or more embodiments of the clutch 100 that includes a cone member 110, contact member 120, attachment member 130, biasing member 140, and ball members 150. FIG. 10 illustrates a section view of the members taken along a first sectional line.

The contact member 120 is fixedly mounted along the feed shaft 40. The contact member 120 is fixed such that it does not rotate or axially move during rotation and axial movement of the feed shaft 40 and differential feed gear 32. The contact member 120 includes a central opening sized to receive the feed shaft 40. The central opening may further extend around one or more sleeves that extend around the feed shaft 40. The contact member 120 includes a radial flange 121 that extends outward from the central opening. Openings 122 extend through the flange 121 and each is sized to receive a ball member 150. The height of the flange 121 is less than a height of the ball members 150. The number of openings 122 and ball members 150 spaced around the flange 121 may vary. In one or more embodiments, at least three openings 122 with ball members 150 are spaced around the flange 121.

The biasing member 140 is positioned to contact against and apply a biasing force to the ball members 150. An opposing side of the biasing member 140 is secured by an attachment member 130. The attachment member 130 is movably connected to the contact member 120. The attachment member 130 is axially movable towards the flange 121 to adjust a space between the flange 121 and attachment member 130 that houses the biasing member 140. In one or more embodiments, one or more fasteners extend through the attachment member 130 and into the flange 121. Receptacles on the top end of the fasteners are accessible to rotate the fasteners and adjust a spacing of the housing to adjust a force applied by the biasing member 140 to the ball members 150.

Figure 11:
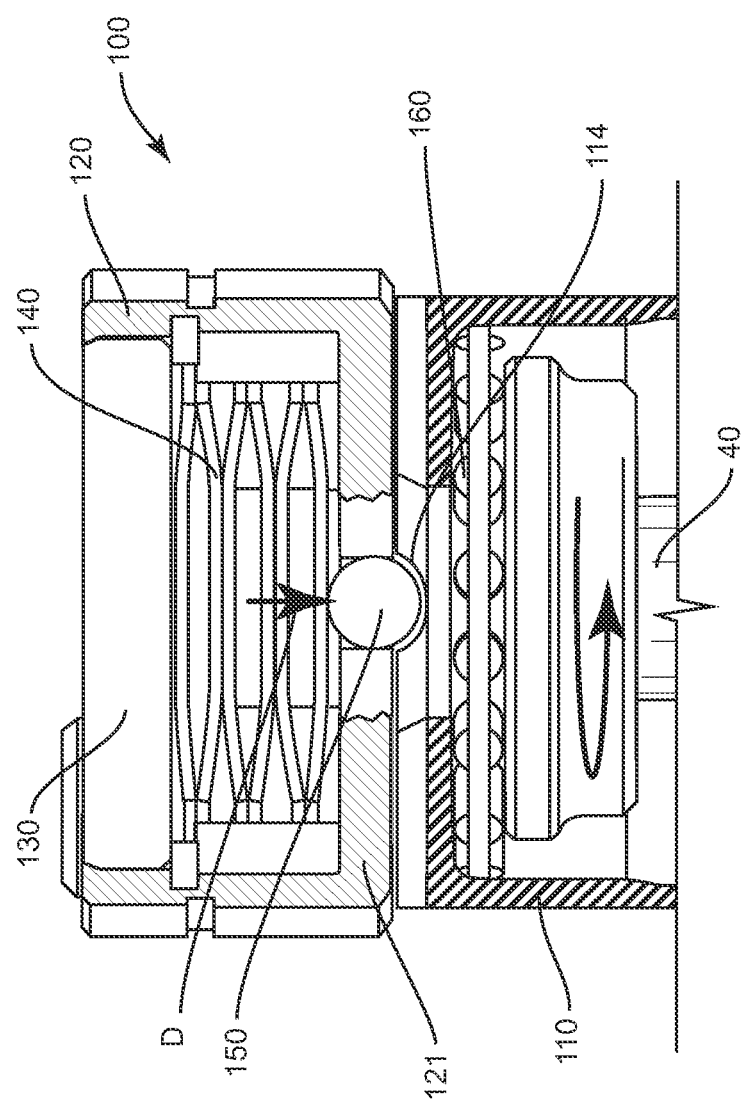
FIG. 11 is a schematic side sectional view cut through a section of the cone member, biasing member, and contact member of a ball member positioned in a pocket in an engaged orientation that prevents rotation of the differential feed gear.

The cone member 100 includes an annular shape with a base 111 having a central opening that extends around the feed shaft 40. The opening may further extend around a portion of the contact member 120 as illustrated in FIG. 10. An outer axial wall 112 extends axially outward from the base 111 towards the differential feed gear 42. An angled cam surface 113 is formed around the inner perimeter of the wall 112 with an end of the wall 112 decreasing towards the differential feed gear 42. The base 111 includes pockets 114 each sized to receive one of the ball members 150. The pockets 114 may have a variety of shapes. In one embodiment or more embodiments as illustrated in FIG. 11, the pockets 114 include a curved shape with a wall angle of between 5-85 degrees. A bearing 160 may be positioned at the cone member 110.

The differential feed gear 42 includes a male cone 48 that extends axially towards the cone member 100. The cone 48 has an angled outer surface 109 with the cone decreasing in width towards the cone member 100. The cone member 48 is sized to fit between the axial wall 112 of the cone member 100 during axial movement of the differential feed gear 42. The angle of surface 109 of the cone member 48 corresponds to the angle of the cam surface 113 to provide contact between the surfaces. FIG. 10 includes an embodiment with the differential feed gear 42 including the male cone 48. Other embodiments may reverse the male and female cones 48, 100 (i.e., the cone member 100 may include a male cone that extends into a receptacle in the differential feed gear 42).

When the differential feed gear 42 moves axially away from the differential drive gear 41, the male cone 48 contacts against the angled cam surface 113 of the cone member 100. The cone member 110 is held stationary due to the force applied by the biasing member 140 through the ball members 150. The cone angle between the cam surfaces 113, 109 is designed to create a holding force to prevent rotation of the differential feed gear 42 but still allow axial movement of the differential feed gear 42 (i.e., the angle does not create a taper lock). Because the differential feed gear 42 remains engaged with the spindle feed gear 32 through their gear teeth, the spindle feed gear 32 is also prevented from rotating.

While the spindle feed gear 32 is held stationary, the spindle 30 moves in the retract direction to the home position. In one or more embodiments, the home position includes the point at which the retract/home stop 81 contacts against the corresponding lower contact member 82. At this point, it is desirable to shut off the motor 12. This may include stopping air from an air supply for an air motor 12, shutting off a hydraulic motor 12, or shutting off power to an electrical motor 12. For an air motor 12, the shut off may occur using a positive air signal to shift a valve or exhausting of the air in the air logic system again to close the valve supplying the air motor 12.

The clutch 100 may also be configured to prevent the spindle 30 from jamming. In the event that the limit of the spindle travel is reached when the spindle 30 has retracted and the motor 12 has not yet shut off, the clutch 100 is configured to allow the differential feed gear 42 and spindle feed gear 32 to rotate again thereby eliminating the spindle 30 from becoming jammed.

When the spindle 30 is moving in the retract direction prior to reaching the home position, the torque applied to the differential feed gear 42 through the spindle feed gear 32 is less than the force applied to hold cone member 110 with the ball members 150. At this time, the differential feed gear 42 is in contact with the cone member 110 and held stationary relative to the cone member 110 through a force applied to the differential feed gear 42 through one or more of the air acting against the piston 43 and the biasing member 46. Therefore, the differential feed gear 42 and the cone member 110 remain static.

When the spindle 30 reaches the home position and continues to rotate, the spindle feed gear 32 will move axially along the spindle 30 and against the spindle drive gear 31. The amount of force to axially move the spindle 30 against the spindle drive gear 31 is greater than the force applied by the biasing member 140 through the ball members 150 against the cone member 110. This causes the ball members 150 to be moved upward in their openings 122 and for the surface of the base of the cone member 110 to contact against the surface of the flange 121 of the contact member 120. This results in the cone member 110 rotating through the bearing relative to the contact member 120. Thus, the differential feed gear 42 rotates with the cone member 110, and the spindle feed gear 32 will also rotate due to the engagement with the differential feed gear 42.

Figure 12:
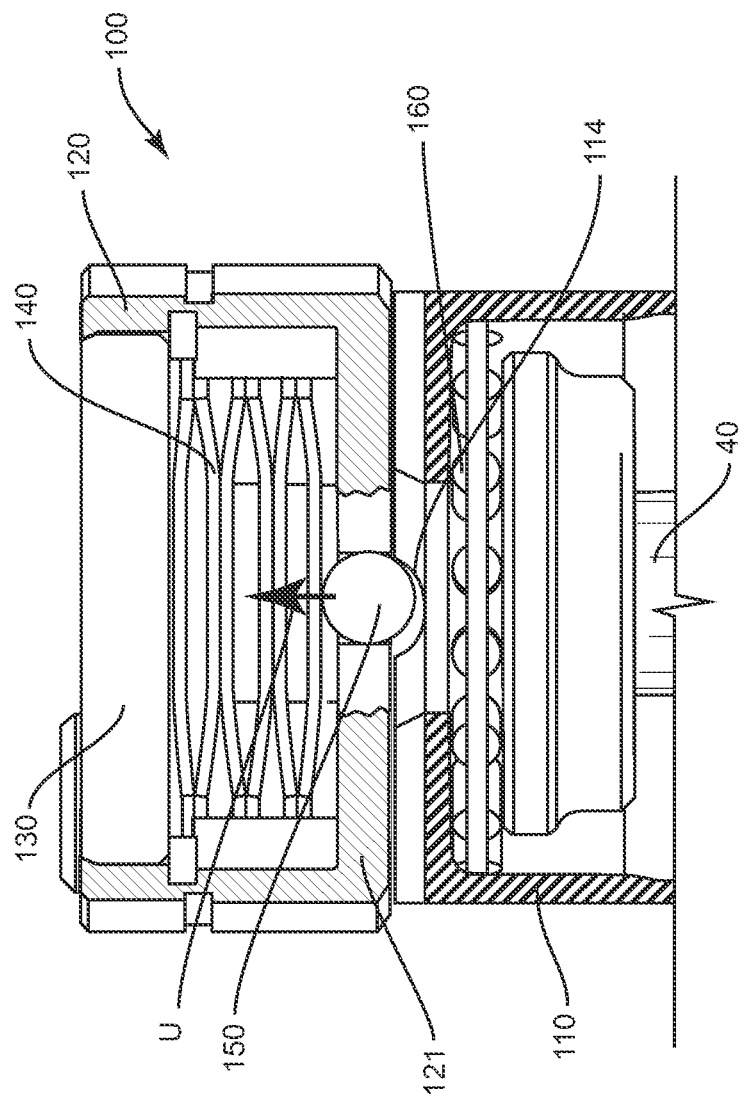
FIG. 12 is a schematic side sectional view cut through a section of the cone member, biasing member, and contact member of a ball member moving out of the pocket during slip of the clutch.

The movement of the ball members 150 is illustrated in FIGS. 11 and 12. FIGS. 11 and 12 are schematic sectional views to illustrate the movement of the ball members 150. In FIG. 11, the force of the biasing member 140 is greater thus driving the ball members 150 downward as illustrated by arrow D to remain in their corresponding pockets 114. As the torque increases, the force applied to the ball members 150 through the cone member 110 causes an upward force U to be applied to the ball members 150 to drive them out of the pockets 114.

Rotation of the spindle feed gear 32 means the spindle 30 no longer moves axially in the reverse direction. This prevents the spindle feed gear 32 from jamming the mechanism. This prevents the spindle feed gear 32 from locking against the spindle drive gear 31 and/or and the retract/home member 81 from locking against the contact member 82. The amount of forward movement is usually generally small as the air motor 12 should quickly shut down.

In one or more embodiments, an operator is able to adjust the position of the attachment member 130 relative to the contact member 120 to control a biasing force applied to the ball members 150 through the biasing member 140. This provides for the operator to control an amount of torque required prior to preventing further spindle retract. Variability in this setting of the slip torque in the home position is desirable to enable a range of tool speeds/torques and thrusts to be accommodated and to ensure that the system can hold the gears stationary during the required retract but allow the gears to slip before mechanically locking.

Figure 13:
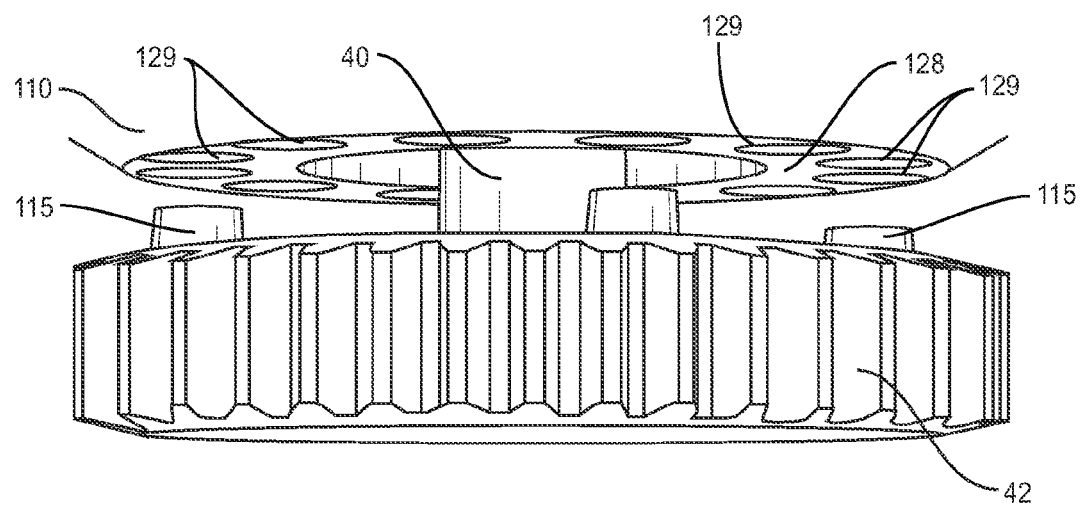
FIG. 13 is a side perspective view of a holding mechanism to prevent rotation of a differential feed gear.

The engagement between the cone member 110 and the differential drive gear 42 to prevent rotation may include various embodiments. One embodiment as illustrated in FIG. 10 includes a cone clutch configuration with mating angled cam surfaces. FIG. 13 illustrates another embodiment in which the differential feed gear 42 includes one or more axial extensions 115. The cone member 110 includes a face 128 with corresponding cavities 129 sized to receive the extensions 115. Various other interfaces may be configured to prevent the relative rotation of the members.

Figure 14:
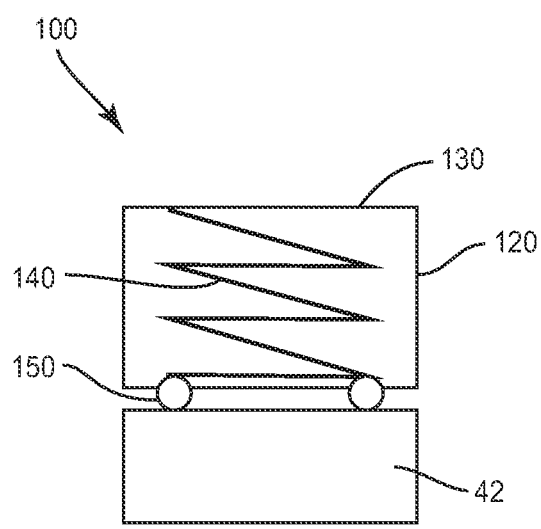
FIG. 14 is a schematic view of a slip clutch.

In one or embodiments, the clutch 100 includes a cone member 110. In other embodiments as illustrated in FIG. 14, the clutch 100 does not include a cone member 110. The differential drive gear 42 engages directly with the contact member 120 and ball members 150. This configuration may also provide for preventing rotation of the differential drive gear 42 after it has axially moved away from the differential drive gear 41.

In one or more embodiments, a single biasing member 140 acts against each of the ball members 150. One or more other embodiments may include a separate biasing member 140 acting against each of the ball members 150.

In one or more embodiments as illustrated in FIGS. 10, 11, and 12, the contact member 120 with the biasing members 150 are axially aligned with the cone member 110. One or more other embodiments may be positioned the contact member 120 and biasing members 150 along a lateral side of the cone member 120 to contact against the cone member 120.

The various biasing members may include a variety of different configurations. The biasing members may include a single member, or multiple members. The multiple members may be the same or may be different. The members may include, but are not limited to Belleville washers, wave washers, wave springs and compression springs.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A positive feed tool configured to operate in a forward direction and a reverse direction, the feed tool comprising:
    an elongated spindle aligned with and configured to axially move along a feed path, the spindle including a retract stop to control an extent of axial movement of the spindle in the reverse direction;
    a spindle rotation mechanism coupled to the spindle to rotate the spindle;
    a spindle feed gear and a differential feed gear configured to drive the spindle axially along the feed path, the spindle feed gear and the differential feed gear each including gear teeth that are engaged together;
    a clutch mechanism positioned at the differential feed gear to selectively control rotation of the differential feed gear, the clutch mechanism including a contact member and a biasing member;
    wherein the clutch mechanism being configured to engage with the differential feed gear to:
        prevent rotation of the differential feed gear and the spindle feed gear causing the spindle to move in the reverse direction when the torque that is applied to the differential feed gear through the spindle feed gear is less than a holding force applied to the contact member;
        allow rotation of the differential feed gear and the spindle feed gear to prevent the spindle from moving further in the reverse direction when the torque that is applied to the differential feed gear through the spindle feed gear is greater than the force applied to the contact member.

2. The positive feed tool of claim 1, wherein the differential feed gear directly contacts against the clutch mechanism during movement of the spindle in the reverse direction prior to engagement of the retract stop and a stop member.

3. The positive feed tool of claim 1, wherein the spindle feed gear is spaced away from the clutch mechanism and is connected to the clutch mechanism through the differential feed gear.

4. The positive feed tool of claim 1, wherein the contact member includes a cone shape that includes a first angled cam face and the differential feed gear includes a second angled cam face, wherein the first and second angled cam faces contact together when the differential feed gear is engaged with the contact.

5. The positive feed tool of claim 1, wherein the clutch mechanism further comprises a plurality of ball members, the ball members extend through a fixed base and are biased against the contact member by the biasing member.

6. The positive feed tool of claim 5, wherein the contact member includes pockets along a radial face with each of the pockets sized to receive one of the ball members, the ball members being larger than the pockets such that the ball members extend outward beyond the pockets.

7. The positive feed tool of claim 1, further comprising an adjustment member operatively connected to the biasing member to adjust an amount of force applied by the biasing member, the adjustment member being movably connected to the contact member.

8. The positive feed tool of claim 1, wherein the differential feed gear is axially aligned along a feed shaft with the contact member, the differential feed gear being axially movable relative to the contact member.

9. A method of preventing jamming of a spindle in a positive feed tool, the method comprising:
rotating a spindle and rotating a spindle feed gear that is positioned around the spindle and moving the spindle in a first direction along a feed path, the spindle feed gear being rotated through engagement with a differential feed gear;
preventing the rotating spindle from moving in the first direction and begin moving the rotating spindle feed gear axially along the spindle in an opposing second direction;
moving the differential feed gear into contact with a first section of a clutch, the clutch also including a second section;
applying a clutch force to the first section of the clutch to prevent the first section from rotating relative to the second section and preventing the differential feed gear and the spindle feed gear from rotating while the spindle continues to rotate and begin moving the rotating spindle in the second direction;
preventing the spindle from moving in the second direction beyond a home position and applying a force to the differential feed gear through the spindle feed gear;
when the force applied to the differential feed gear through the spindle feed gear overcomes the clutch force, rotating the first section and the differential feed gear together and thereby rotating the engaged spindle feed gear; and
rotating the spindle feed gear about the spindle and preventing further movement of the spindle in the second direction.

10. The method of claim 9, wherein preventing the spindle from moving in the second direction beyond the home position comprises moving the spindle in the second direction and contacting a retract stop member on the spindle against a contact member while the spindle feed gear is prevented from rotating.

11. The method of claim 10, further comprising moving the spindle feed gear axially along the spindle and against a spindle drive gear after contacting the retract stop member on the spindle against the contact member.

12. The method of claim 9, further comprising applying the clutch force to the first section by biasing a plurality of ball members against the first section of the clutch.

13. The method of claim 12, further comprising applying the force on the differential feed gear through the spindle feed gear and moving the plurality of ball members out of corresponding pockets on the first section and rotating the first section relative to the second section and rotating together the differential feed gear and the engaged spindle feed gear.

14. The method of claim 9, further comprising moving the differential feed gear axially relative to the spindle feed gear and into engagement with the clutch and preventing rotation of the differential feed gear.

15. The method of claim 9, wherein preventing the rotating spindle from moving in the first direction comprises contacting a depth stop member connected to the spindle against a contact member.

* * * * *